US 8,707,452 B1

(12) United States Patent
Block et al.

(10) Patent No.: US 8,707,452 B1
(45) Date of Patent: Apr. 22, 2014

(54) SECURE DATA MANAGEMENT DEVICE

(75) Inventors: Frederick Block, Westminster, CO (US); Dennis C. Episkopos, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 1132 days.

(21) Appl. No.: 12/102,655

(22) Filed: Apr. 14, 2008

(51) Int. Cl.
*G06F 17/30* (2006.01)

(52) U.S. Cl.
USPC ............... 726/28; 726/16; 726/21; 726/27; 726/29; 726/30; 726/31; 380/30; 713/186; 455/556.2; 455/558

(58) Field of Classification Search
USPC ............... 726/31, 16, 21–30; 713/2, 4, 186; 455/556.2, 558; 380/30
See application file for complete search history.

(56) References Cited

U.S. PATENT DOCUMENTS

| 5,889,860 | A | * | 3/1999 | Eller et al. | 705/51 |
|---|---|---|---|---|---|
| 6,457,130 | B2 | * | 9/2002 | Hitz et al. | 726/27 |
| 6,738,736 | B1 | * | 5/2004 | Bond | 703/2 |
| 7,092,915 | B2 | | 8/2006 | Best et al. | |
| 7,251,480 | B1 | * | 7/2007 | Oh et al. | 455/413 |
| 7,478,434 | B1 | * | 1/2009 | Hinton et al. | 726/27 |
| 7,779,482 | B1 | * | 8/2010 | Yen et al. | 726/30 |
| 7,814,554 | B1 | * | 10/2010 | Ragner | 726/27 |
| 7,861,306 | B2 | * | 12/2010 | DeMello et al. | 726/26 |
| 7,895,661 | B2 | * | 2/2011 | Dowdy et al. | 726/27 |
| 7,913,311 | B2 | * | 3/2011 | Alain et al. | 726/28 |
| 7,945,959 | B2 | * | 5/2011 | Ilechko | 726/26 |
| 8,260,353 | B2 | * | 9/2012 | Hugot | 455/558 |
| 8,307,425 | B2 | * | 11/2012 | Gaya | 726/21 |
| 2005/0120242 | A1 | * | 6/2005 | Mayer et al. | 713/201 |
| 2005/0195975 | A1 | * | 9/2005 | Kawakita | 380/30 |
| 2006/0181558 | A1 | * | 8/2006 | Walmsley et al. | 347/12 |
| 2006/0272023 | A1 | * | 11/2006 | Schmeidler et al. | 726/26 |
| 2007/0054618 | A1 | * | 3/2007 | Lewis et al. | 455/41.2 |
| 2007/0266444 | A1 | * | 11/2007 | Segal | 726/27 |
| 2008/0120716 | A1 | * | 5/2008 | Hall et al. | 726/16 |
| 2008/0148059 | A1 | * | 6/2008 | Shapiro | 713/186 |
| 2008/0201784 | A1 | * | 8/2008 | Someshwar | 726/28 |
| 2008/0280644 | A1 | * | 11/2008 | Hugot | 455/556.2 |
| 2009/0029766 | A1 | * | 1/2009 | Lutnick et al. | 463/29 |
| 2009/0187995 | A1 | * | 7/2009 | Lopatic | 726/31 |
| 2009/0254972 | A1 | * | 10/2009 | Huang et al. | 726/1 |
| 2011/0162076 | A1 | * | 6/2011 | Song et al. | 726/26 |
| 2011/0312841 | A1 | * | 12/2011 | Silverbrook et al. | 506/40 |

OTHER PUBLICATIONS

Internet Article "VT100"; http://64.233.167.104/search?q=cache:o0jgvPd8y9AJ:en.wikipedia.org/wiki/VT100+DEC+VT100+memory&hl=en&ct=clnk&cd=1&gl=us; 2 pgs.
Internet Article "Meet the Family"; http://vt100.net/vt_history; 3 pgs.
Internet Article "4.15 User Defined Keys (DECUDK)"; http://vt100.net/docs/vt220-rm/chapter4.html#S4.15; 1 pg.

* cited by examiner

Primary Examiner — Thu Ha Nguyen
(74) Attorney, Agent, or Firm — Sheridan Ross P.C.

(57) ABSTRACT

Methods, devices, and systems for managing sensitive data are provided. The management tool may be provided on a user input device, as opposed to being provided in memory or in a peripheral that can be read from a program running on a computing platform. The management tool may be maintained in a read/write isolation mode where no data is transmitted outside of the management tool unless the user input device is disengaged from the computing platform, at which point data may be transmitted from the management tool for ultimate delivery to the computing platform.

16 Claims, 9 Drawing Sheets

| Application | User Name | Password | Encryption Key | Additional Data |
|---|---|---|---|---|
| Application 1 | User Name 1 | Password 1 | Key 1 | Preferences, Cookies, Credit Card Information |
| Application 2 | User Name 2 | Password 2 | Key 2, 3 | Address |
| Application 3 | User Name 1 | Password 3, 4 | Key 4 | Preferences, Field Entry Instructions |
| ... | ... | ... | ... | ... |
| Application N | User Name N | Password N | Key N | DTMF Information |

*Fig. 5*

SECURE DATA MANAGEMENT DEVICE

FIELD OF THE INVENTION

The invention relates generally to maintaining sensitive data and more specifically to devices used to maintain such data.

BACKGROUND

Most computer users need to set and remember numerous passwords for various systems and applications they access. Traditionally, a user had to write all of these passwords and user names on a piece of paper or a number of reminder notes. These mechanisms for managing the plethora of required passwords are either not secure, inconvenient to use, or both.

A variety of software based password managers have been developed to address this problem. Such password management tools allow users to store passwords on their PCs and access these passwords with a single master password. As can be seen with reference to FIG. 1, a computing system 100 is shown comprising a user display 104, a processor 108, memory 112, and a number of user input devices 116, 120. These types of computing systems 100 utilize the memory 112 to store the password management tool. Thus, when a user needs to access the passwords in the password management tool, the user only needs to provide the proper entry (e.g., a master password) via the keyboard 116. Then, the processor 108 is able to retrieve the necessary passwords from the password management tool stored in memory 112.

The problem common to these types of password management tools is that the master password file is simply a file on the user's PC that can be copied by malware (i.e., a virus) to a remote location. Once at the remote location, an attacker can decrypt the file using brute force techniques (i.e., by trying all possible master passwords). Storing passwords in an encrypted master password file is more secure than having them written down. However, given the prevalence and advancement of viruses being capable of collecting information from a user's PC and transmitting this information to a remote location makes these techniques considerably less secure than they appear.

U.S. Pat. No. 7,092,915 provides an attempt to address the above-described shortcomings in password management tools. More specifically, the '915 patent teaches a method of storing passwords in a mobile device, such as a PDA, that has the stored passwords input to the PC applications using a special driver. While this presents an improvement in the art, it fundamentally just pushes the same problem from the PC to the PDA, which is itself a general purpose computer that is also subject to malware attacks.

SUMMARY

Accordingly, there exists a need for a device that can manage passwords and other sensitive data and provide that data, when necessary, to the computing platform. It would be desirable for the device to have some mechanism that read/write isolates the device from any other type of processing platform until it is desired to transmit the sensitive data maintained on the device. When it becomes desirable to transmit the sensitive data from the device managing the sensitive data, it would also be desirable to restrict access to the device from the computing platform, since malware generally resides on the platform. Thus, the chances of malware performing an unauthorized copying of the sensitive data may be reduced if not eliminated since the malware never has complete access to all of the sensitive data. Rather, the sensitive data would only be accessed and transmitted on an as-needed basis.

These and other needs are addressed by various embodiments and configurations of the present invention. The present invention is directed generally to maintaining sensitive data in a secured state on a read/write isolated memory device. The method generally comprising:

maintaining sensitive data on a security module;

restricting read/write access to the security module until physical user action has been taken at the security module;

detecting a first user input at the security module; and in response to detecting the first user input, transmitting a selected amount of the sensitive data from the security module to a computing platform.

In accordance with at least some embodiments of the present invention, the security module may be used to manage a master password list or other collection of sensitive data instead of managing the master password list with a software application running on a PC or a PDA. A special user input device (e.g., a keyboard, peripheral, etc.) may be provided with built-in hardware for either managing a master password list store in the keyboard itself or for receiving a portable security device capable of providing the same features. Thus, the master password list and other sensitive data can be completely isolated from the PC, but a user is still provided with a way to select a password and cause the user input device to transmit the password as if it were being typed. Elements of this solution may include, for example, (i) a physical switch or button enabling transmission of a selected password or other sensitive data (as if typed); (ii) a small, character display local to the user input device; (iii) a volatile or non-volatile storage area in the security module for maintaining account descriptions and associated (encrypted) passwords; (iv) a mechanism for adding, searching, changing, and deleting passwords and account information stored in the master list; (v) a mechanism for using a master password that allows a selected password or other type of sensitive data to be used (there may also be timeouts imposed for mistyping the master password); and (vi) a mechanism for making the master password list itself available on a removable (portable) device that can plug into any compatible user input device.

In accordance with at least one embodiment of the present invention, the user input device and/or security module may be placed in a "learn" mode with a physical switch that disengages the user input device from the computing platform. In "learn" mode the user input device and/or security module (and not the computing platform) prompts the user on a display provided on the user input device and/or security module to enter an account name, followed by the password for that account, an access authorization password, and any other sensitive data related to the account. The access authorization password (i.e., the master password used to authorize transmission of the account data) can be the same for all different accounts (e.g., various application data sets) or can be unique for each account. The user input device and/or security module stores the account description and the encrypted password in its memory. When done with the "learn" mode, the user can flip the switch, thereby causing the user input device to act in its normal fashion and access to the stored account names and encrypted passwords is then restricted.

At some later point in time, a computer application being accessed by the computing platform may prompt the user to enter a password and other sensitive data. The user can put the user input device and/or security module into "send password" mode by engaging a physical switch and then the user can scroll through the stored accounts (e.g., by using a thumbwheel, arrow keys, or similar type of user input) until the desired account identifier is displayed. The user may also attempt to access the desired account information by utilizing a keyword search capability. When the desired account identifier is displayed the user can type the access authorization password for the account to authorize transmission of the account data. After the access authorization password has been entered, the user can engage a physical "send" button (or switch) that causes the user input device and/or security module to decrypt the stored password and send the resulting string as if it had been typed (i.e., in the same format as a string created by engaging a user input device, such as a QWERTY keyboard.

As can be appreciated, the security module may be built in the user input device or in a modular fashion allowing the stored list of sensitive data to be removed from one user input device and plugged into another one (e.g., another keyboard, a mouse, a phone, or a Point of Service (POS) device).

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIG. 5 is a diagram depicting a data structure used in accordance with embodiments of the present invention;

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any computing application in which it is desirable to maintain sensitive data.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
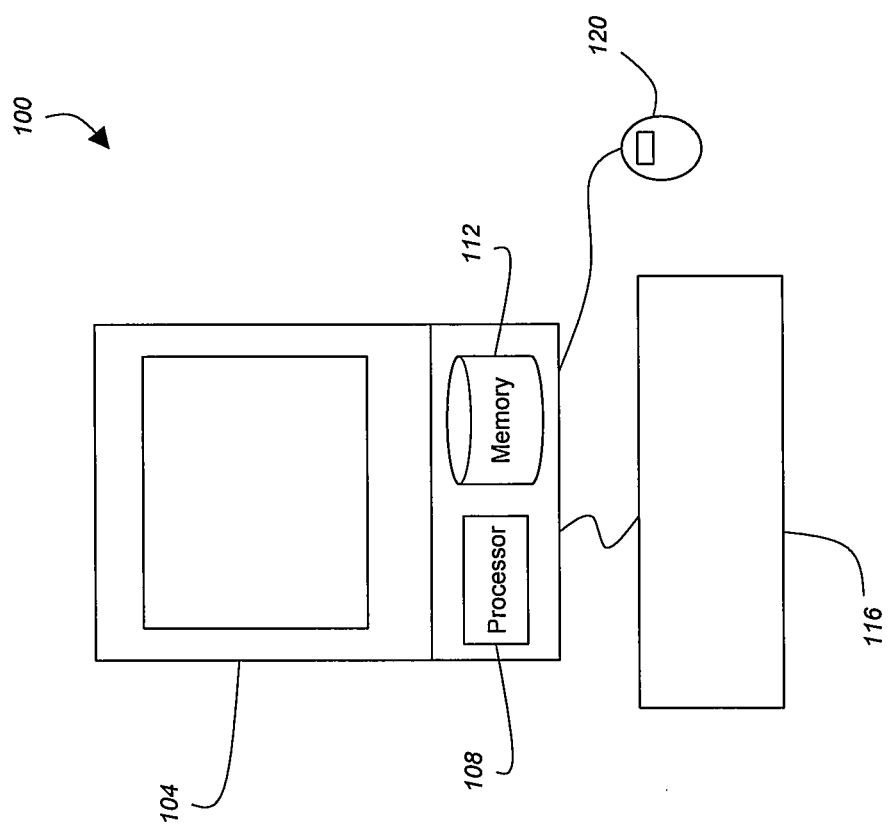
FIG. 1 is a block diagram depicting a personal computer system in accordance with embodiments of the prior art.
Figure 2:
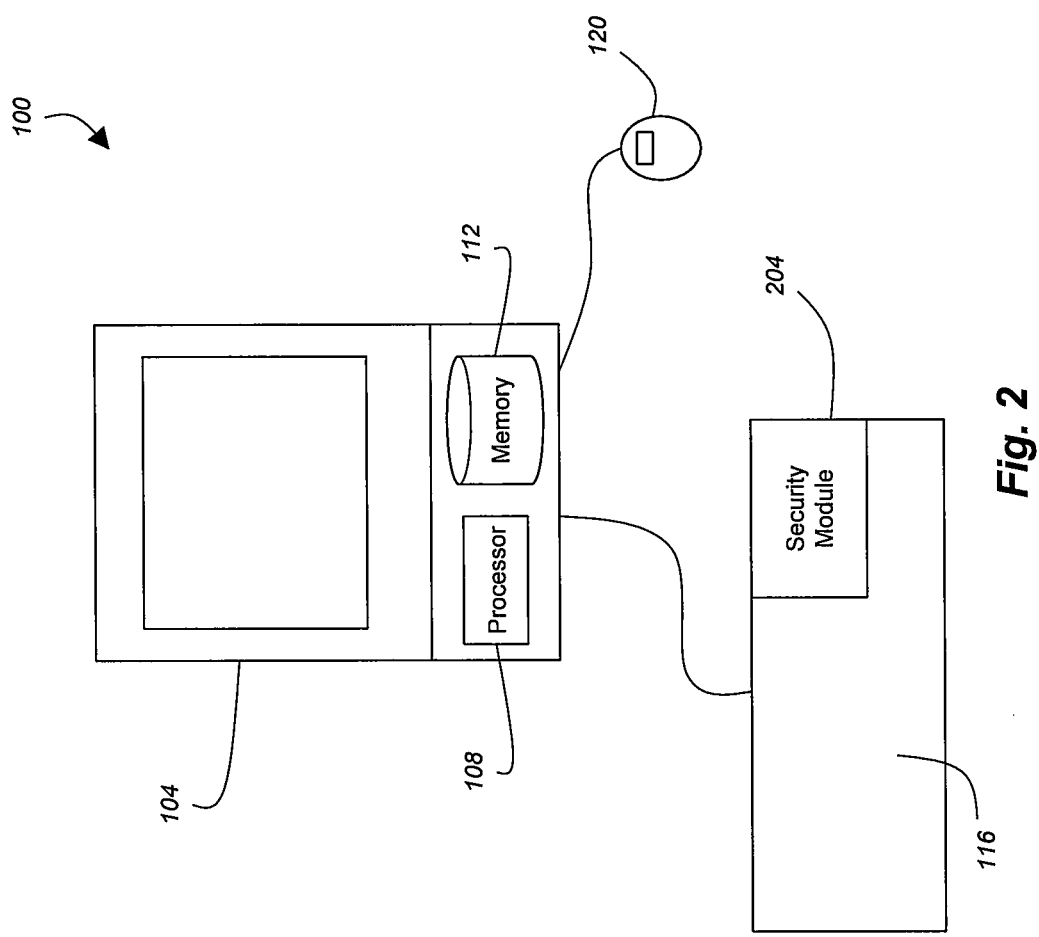
FIG. 2 is a block diagram depicting a personal computer system in accordance with embodiments of the present invention.

Referring now to FIG. 2, a computing system 100 will be described in accordance with embodiments of the present invention. The computing system 100 differs from the computing systems of the prior art in that the computing system comprises a security module 204 on an input device, such as the keyboard 116. The security module 204 may also reside on a dongle plug in or any other type of input device that is in communication with the computing platform (i.e., processor 108 and memory 112). As can be appreciated, the memory 112, may comprise a solid-state memory that is separate from the processor 108 or may be temporary memory that is integrated to the processor 108. In accordance with embodiments of the present invention, the computing platform may correspond to a personal computer, a remote server (e.g., a webserver, a call server, or any other dedicated processing device), a laptop, a Personal Digital Assistant (PDA), or any other device that is capable of receiving and processing data.

The security module 204 may be employed to maintain and provide, on an as-needed basis, passwords, user names, and other sensitive data to the computing platform 108, 112. The security module 204 is unique in that while it may be physically connected to (or integrated in) the input device 116, no read and/or write access is allowed to the security module 204 unless the corresponding input device 116 is disengaged (i.e., electrically and/or read/write isolated) from the computing platform 108, 112. Read/write access to the security module 204 may be achieved when the input device 116 is disengaged from the computing platform. Thus, information may be shared between the security module 204 and input device 116 (e.g., retrieved from and/or provided to the security module 204).

Figure 3:
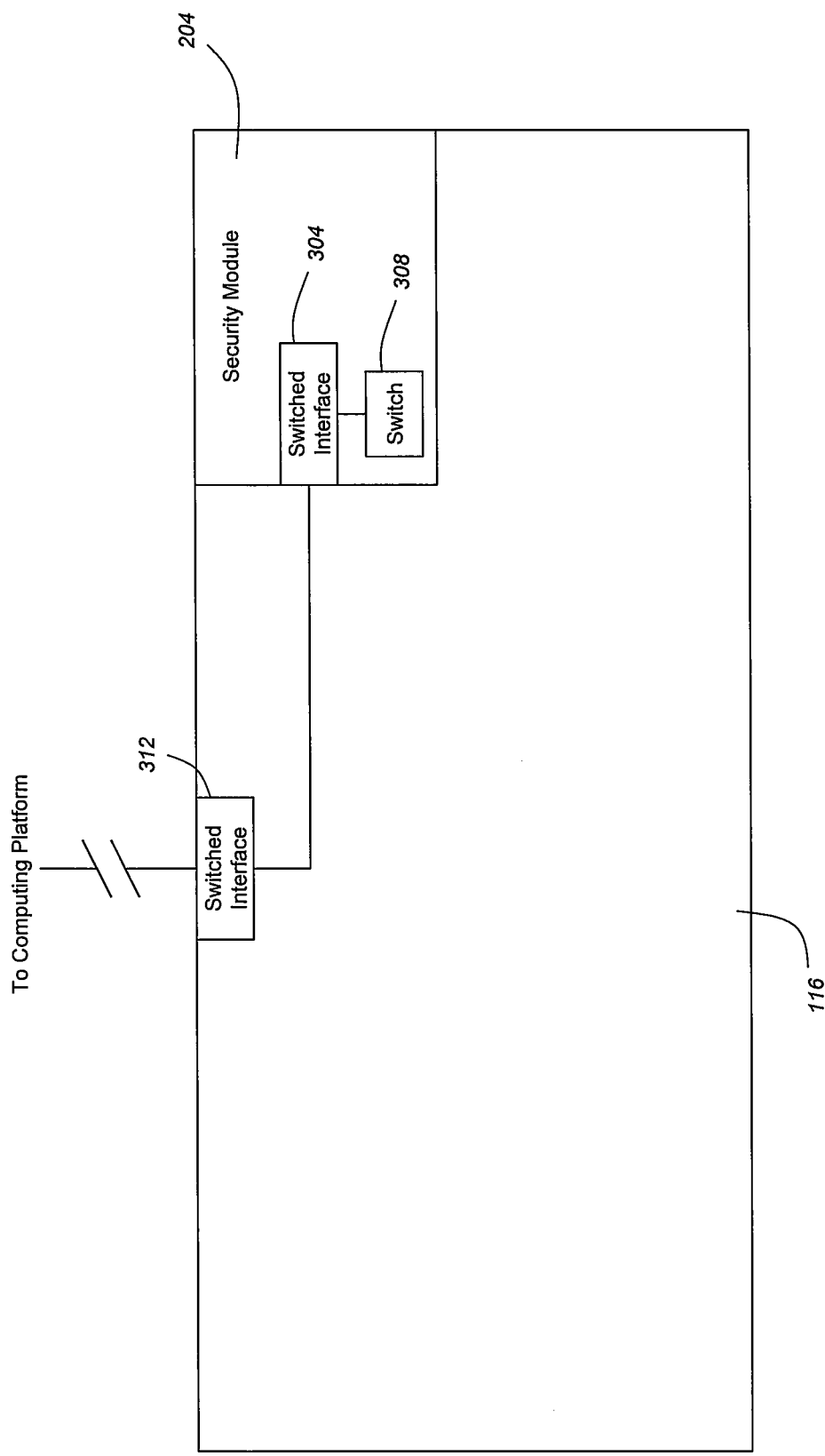
FIG. 3 is a block diagram depicting a user input device for a computer system in accordance with embodiments of the present invention.

With reference now to FIG. 3, the interaction between the input device 116 and the security module 204 will be described in accordance with at least some embodiments of the present invention. In one embodiment of the present invention, the security module 204 may comprise a peripheral device that can be plugged into the input device 116 at a receiving port or the like. The receiving port may provide a physical connection between the module 204 and input device 116. Alternatively, the security module 204 may be integrated into the input device 116, such that no receiving port is necessary.

In either configuration, the electrical connectivity between the input device 116 and security module 204 may be controlled by a switched interface 304. The switched interface 304 may correspond to any type of known computing interface such as a PS/2 interface, USB interface, or any other type of parallel or serial device interface. Examples of other types of interfaces that may be employed in accordance with embodiments of the present invention include, but are not limited to, a network interface card, a modem, a wired telephony port, a serial or parallel data port, radio frequency broadcast receiver, or other wired or wireless communication network interfaces.

The switched interface 304, however, may not be activated (i.e., allow commands to pass therethrough) unless a local switch 308 is engaged. The local switch 308 allows a user to control the read/write access to the sensitive data that may reside on the security module 204. In accordance with at least one embodiment of the present invention, the switch 308 comprises a button that may be depressed at which point electrical conductivity of the switched interface 304 may be activated. When the switch 308 is not depressed or otherwise engaged, the switched interface 304 may restrict the input device 116 or the computing platform 108, 112 from accessing the sensitive data on the security module 204.

The input device 116 may comprise a second switched interface 312 that allows it to be selectively engaged and disengaged with the computing platform 108, 112. Operation of the second switched interface 312 may also be controlled by the switch 308. Both the first 304 and second 312 switched interfaces 312 may operate in cooperation with one another. More specifically, when the first switched interface 304 is activated and allowing access to the security module 204, the second switched interface 312 may be deactivated thereby disengaging the input device 116 from the computing platform 108, 112. Conversely, when the first switched interface 304 is deactivated and read/write access to the security module 204 is restricted, the second switched interface 312 may be activated thereby allowing communications between the input device 116 and computing platform 108, 112.

The switched interfaces 304, 312 may correspond to logical switches that simply accept or refuse certain read and/or write requests when they are in a particular mode. Alternatively, the switched interfaces 304, 312 may correspond to hardware and physical switches that physically disconnect or otherwise interrupt electrical communications between devices when in an inactive mode and physically connect or otherwise permit electrical communications between devices when in an active mode. In accordance with at least some embodiments of the present invention, the switch 308 may be configured to directly control both the first 304 and second 312 switched interfaces. Alternatively, a chain of command may be employed where the switch 308 only controls the first switched interface 304 and the first switched interface 304 controls the second switched interface 312 based on its mode of operation.

As can be appreciated by one skilled in the art, although the second switched interface 312 is depicted on the input device 116, the location of the second switched interface 312 is arbitrary. In fact, certain embodiments of the present invention may provide the second switched interface on the computing platform 108, 112. For example, the second switched interface may correspond to a known type of PS/2 or USB interface on a personal computer into which a peripheral device, such as a keyboard 116, may be plugged in. The interface 312 at the personal computer side may comprise a logical or physical switch that is operated based on the state of the switch 308 (i.e., whether the switch 308 is engaged or not). Additionally, the switched interface 312 may be embodied as a set of interfaces on both the computing platform 108, 112 and input device 116 that operate in cooperation with one another thereby allowing them to act like a single switched interface 312.

Similarly, the first switched interface 304 may reside on the input device 116, although it is depicted as being provided on the security module 204. Again, the location of the switched interface 304 is arbitrary and may be altered depending upon system needs and the design of the security module 204. If a more simple security module is desired 204, then the switched interface 304 may be provided on the input device 116 or as a logical block in the security module 204 itself, rather than an actual switch.

Figure 4A:
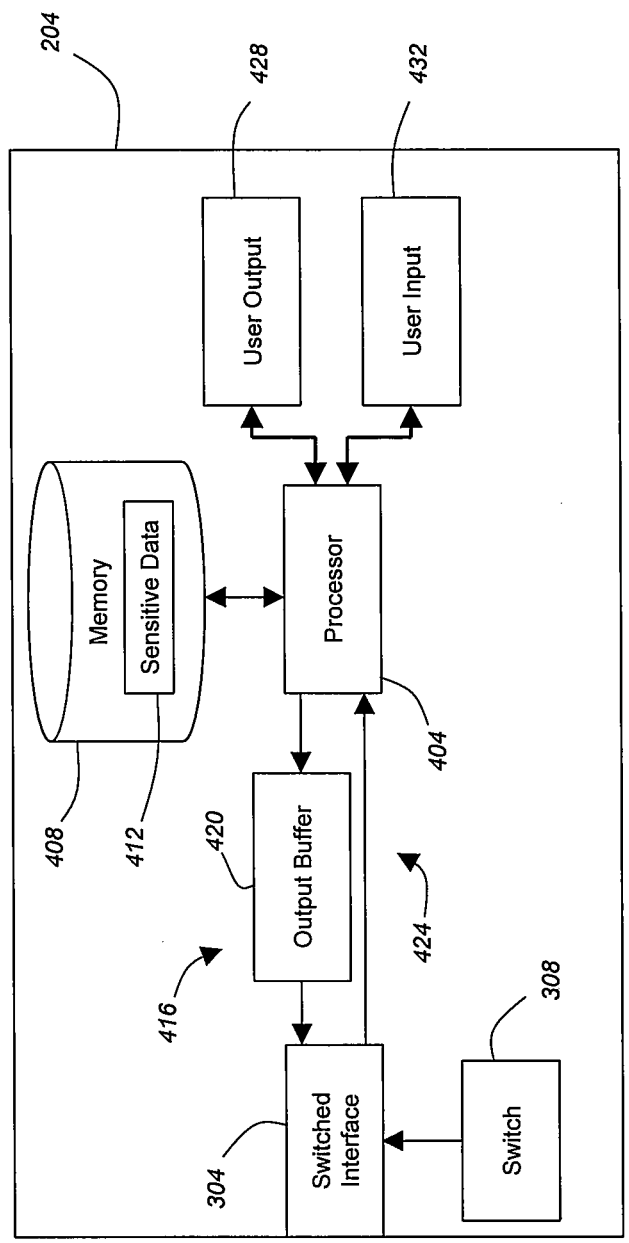
FIG. 4A is a block diagram depicting a first configuration of a security module in accordance with embodiments of the present invention.

With reference to FIG. 4A, a first configuration of a security module 204 will be described in accordance with at least some embodiments of the present invention. The security module 204 may comprise a processor 404, memory 408 for storing sensitive data 412, an output data channel or bus 416 that includes an output buffer 420, an input data channel or bus 424, a user output 428, and a user input 432.

The processor 404 may include any general-purpose programmable processor, digital signal processor (DSP) or controller for executing application programming. Alternatively, the processor 404 may comprise a specially configured application specific integrated circuit (ASIC). The processor 404 generally functions to run programming code implementing various functions performed by the security module 204.

The memory 408 may be used in connection with the execution of programming by the processor 404 and for the temporary or long-term storage of sensitive data 412 or program instructions. The memory 408 may comprise solid-state memory resident, removable or remote in nature, such as EEPROM, VRAM, or NVRAM. It may be preferable, however, to provide memory that is not removable from the security module 204 without breaking the device (i.e., render the security module 204 inoperable). Where the processor 404 comprises a controller, the memory 408 may be integral to the processor 404. The memory 408 may be volatile and/or non-volatile memory depending upon the type of configuration used. In embodiments where sensitive data 412 is created and maintained on memory 408, the memory 408 may correspond to an NVRAM that is operable to maintain the sensitive data 412 when power to the security module 204 is interrupted.

The user output 428 may include any type of visual and/or audible user interface. Examples of suitable user outputs 428 that may be employed in accordance with embodiments of the present invention include, but are not limited to, LED displays, LCD displays, one or more lights, speakers, and the like.

The user input 432 may include any type of interface that allows the user to interact with an operate the processor 404. Exemplary user inputs 432 may include one or more buttons, a keypad, a microphone, a switch, a lever, or the like. In accordance with at least some embodiments of the present invention, the user output 428 and user input 432 may be embodied in a single device, such as a touch-screen device or the like.

The processor 404 may be operable to retrieve the sensitive data 412 from memory 408. The specific portion (e.g., data block(s) storing a particular amount of application data) of the sensitive data 412 that is retrieved from memory may be selected by a user operating the user input 432. The user output 428 may indicate to the user the specific portion of the sensitive data 412 that is currently being retrieved by the processor 404. This particular sensitive data 412 may correspond to the sensitive data that would be transmitted by the security module 204 if the switch 308 were engaged to activate the switched interface 304. The processor 404 may be biased to push the selected portion of sensitive data 412 to the output channel 416 where it is maintained in the output buffer 420 until the switched interface 304 is activated. Upon engagement of the switch, the data in the output buffer 420 (i.e., the selected specific portion of sensitive data 412) may be pushed through the switched interface 304 to the input device 116. After the sensitive data in the output buffer 420 has been completely transferred to the input device 116, the user output 428 may indicate that the output buffer 420 has been emptied. This may prompt the user to release the switch 308, thereby deactivating the first switched interface 304 and activating the second switched interface 312. When the second switched interface 312 is activated, the data that was transmitted by the security module 204 may then be transmitted from the input device 116 to the computing platform 108, 112.

Although the switched interfaces 304, 312 are depicted as being simple interfaces, and although the output buffer 420 is depicted as being separate from the interfaces 304, 312, one skilled in the art will appreciate that the switched interfaces 304, 312 may include buffers for maintaining data in a secured state while the switched interface 304, 312 is deactivated. When the switched interface 304, 312 is activated, the data in the buffer may be transmitted to the input device 116 or computing platform 108, 112 respectively.

Figure 4B:
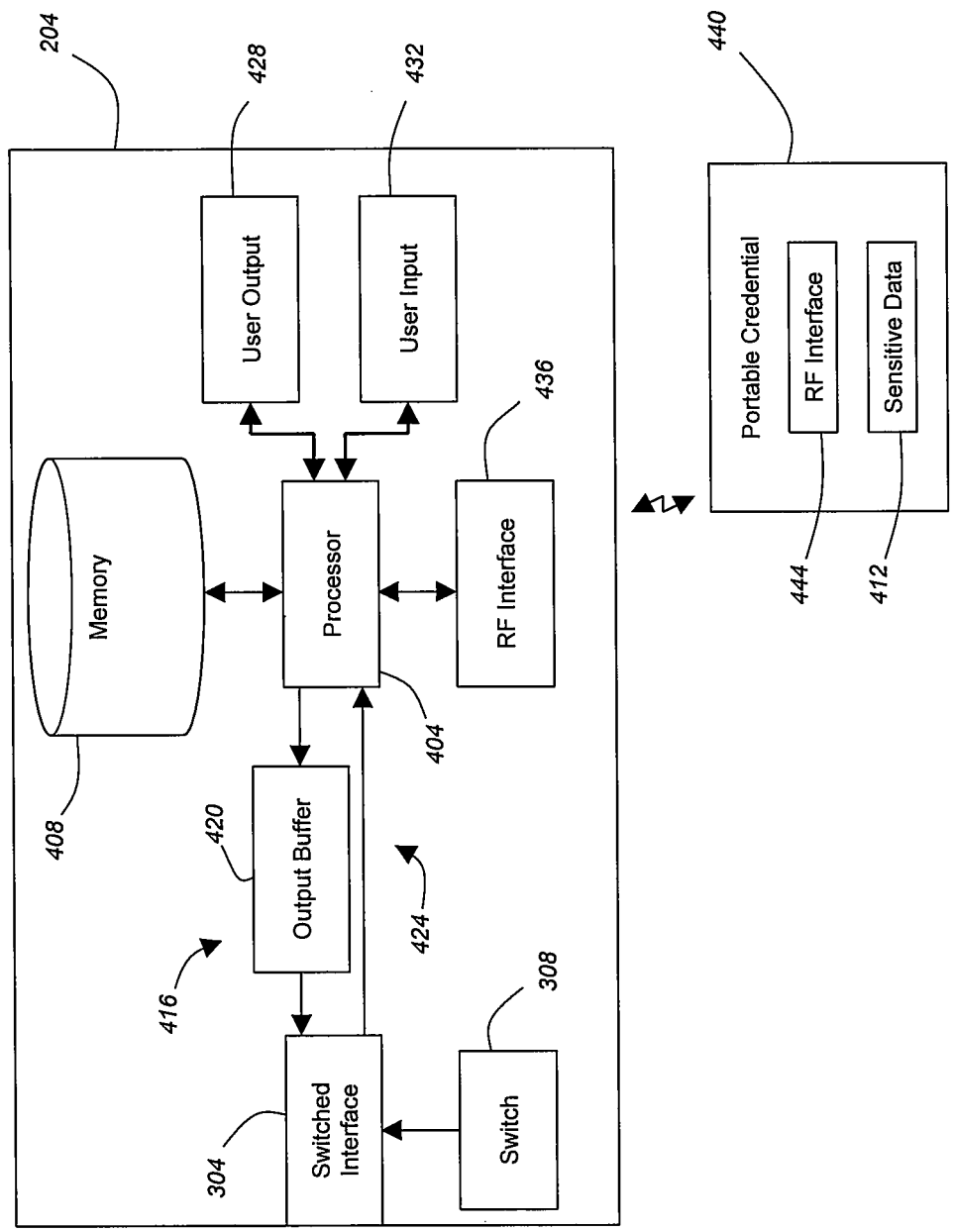
FIG. 4B is a block diagram depicting a second configuration of a security module in accordance with embodiments of the present invention.

Referring now to FIG. 4B, an alternative configuration of a security module 204 will be described in accordance with at least some embodiments of the present invention. The security module 204 may be similar to the security module 204 discussed in connection with FIG. 4A except that the sensitive data 412 may not be maintained permanently on the local memory 408. Rather, sensitive data 412 may be carried by a user on a portable credential 440, such as a Radio Frequency Identification (RFID) device that includes a "transmit now" button. The portable credential 440 may correspond to a proximity card, smart card, or a similar type of form factor capable of carrying data and transmitting said data to another device comprising an RF interface 436 and the portable credential 440 may be restricted from transmitting any data stored thereon unless the "transmit now" button is engaged. In accordance with at least some embodiments of the present invention, when the portable credential 440 is brought within communication range of the RF interface 436, the credential 440 is authenticated with the security module 204, then the sensitive data is transmitted via the RF interface 444 of the portable credential to the RF interface 436 of the security module 204. RF communication devices and their associated interfaces are well known and described, for example, in U.S. Patent Application No. 2008/018,469 to Volpi et al., the entire contents of which are incorporated herein by reference.

The portable credential 440 may permanently maintain the sensitive data 412 and temporarily provide the sensitive data 412 to the security module 204 when necessary. More specifically, a user may carry around the portable credential 440 comprising the sensitive data 412 and present the portable credential 440 to the security module 204 associated with the computing platform 108, 112 that the user intends to utilize. The sensitive data may be transferred to the security module 204 via the RF interfaces 436, 444 and can be subsequently stored in the memory 408. The sensitive data 412 may remain on the memory 408 for a predetermined amount of time, after which it may be purged from memory either by the memory resetting itself (e.g., if the memory 408 is a volatile memory) or by the processor 404 initiating a delete of the corresponding memory areas storing the sensitive data 412. Such a command may be initiated by a timer mechanism that is transmitted along with the sensitive data 412 from the portable credential 440. When the timer mechanism expires, the processor 404 may initiate its deletion of the sensitive data 412 from memory 408.

In accordance with at least some embodiments of the present invention, the sensitive data 412 may be changed while it resides on the local memory 408 (e.g., during a learning mode of operation, provided that the input device 116 is disengaged from the computing platform 108, 112). If sensitive data 412 is altered by a user on the local memory 408, the processor 404 may be operable to write such changes back to the sensitive data 412 on the portable credential 440. To effect such a change, the user may present the portable credential 440 to the security module 204 after the sensitive data 412 has been changed on the security module 204. Upon presentation, the processor 404 may cause the updated sensitive data 412 to be transmitted from the RF interface 436 of the security module 204 to the RF interface 444 of the portable credential 440. The updated sensitive data 412 may then replace the previous version of the sensitive data 412 on the portable credential 440. Use of a portable credential 440 to carry around the sensitive data 412 allows the user to access the sensitive data 412 on a number of different computing platforms without carrying the entire security module 204. Rather, the user only needs to carry the portable credential 412 which may be in a more convenient form factor such as a proximity card, smart card, or the like.

With reference now to FIG. 5, an exemplary depiction of the sensitive data structure 412 will be described in accordance with at least some embodiments of the present invention. The sensitive data structure 412 may comprise application data 504 logically separated into a number of different data fields. Examples of such data fields include, without limitation, an application identifier field 508, a user name field 512, a password field 516, an encryption key field 520, and an additional data field 524.

The application identifier field 508 may comprise information related to the particular application that the other stored data is associated with. The information in the application identifier field 508 may be displayed to a user via the user output 428, when that particular portion of sensitive data 412 is currently selected for transmission from the security module 512. The application identifier field may be user configurable to provide some coherent representation of the computer application or the like that will require the associated stored data. For example, the user may have her user name and password stored for her on-line email account. Thus, the user may be able to identify the associated user name and password stored in the sensitive data 412 by naming the corresponding application identifier as "Email Login Information."

The user name field 512 and password field 516 may store the user name and password used to access the particular application, respectively. More particularly, the data in the user name field 512 may correspond to the user name data that is entered for the associated application. Likewise, the data stored in the password field 516 may include the password(s) that are entered for the associated application. Typically, a user name and password may be the only type of data that is required for a user to access a particular computing application. Thus, when a particular application is selected from the sensitive data 412, it may only be necessary to transmit the associated user name and password. Of course, a common user name and/or password may be used for several different applications. In such an event, multiple copies of the same user name and or password may be stored for each application. Alternatively, if memory space is a concern, a single copy of a unique user name and password may be stored, and if it is used for multiple applications, a pointer may be used by the other applications to reference the single copy of the appropriate information.

For additional security purposes, the application data 504 may be encrypted during storage with an encryption key. The encryption key information may be stored in the encryption key field 520. In accordance with one embodiment of the present invention, each set of application data 504 may be encrypted with a different encryption key. In such an embodiment, a different encryption key may be stored in association with a different set of application data 504. Alternatively, a common encryption key may be used to encrypt any sensitive data 412, in which case only a single data block will be required for the encryption key. Of course, multiple encryption keys may be utilized for a single set of application data 504 (e.g., one encryption key for the user name and another encryption key for the password). As yet another variant, multiple encryption keys may be used to secure the application data 504 for a number of different users. If any one of the valid encryption keys is entered by a user, then the corresponding application data 504 may be decrypted and prepared for transmission. The use of different encryption keys for different users may be useful in situations where the security module 204 is used by several different users (e.g., family members, co-workers, etc.).

As noted above, sensitive data 412 may include more than user name and password information. Such additional information may be maintained in the additional data field 524. Examples of the types of additional data that may be stored in connection with application data 504 include, but are not limited to, user preference data, cookies, credit card information, address and other user specific information, field entry instructions, and/or DTMF information. The field entry instructions may be used to automatically insert the user name and password information in their respective fields at the computing platform 108, 112. For example, field entry instructions may include instructions such as "Tab" and "Enter" that will cause the computing cursor at the computing platform 108, 112 to either be moved between entry fields or cause a particular selection option to be selected. The field entry instructions may be dispersed within the user name and password as a string when sensitive data 412 is transmitted from the security module 204. For example, sensitive data 412 may be transmitted as a string containing the following format "user_name_1:tab:password_1:tab:password_2:tab:enter." When the computing platform 108, 112 receives this string the user name and passwords may be automatically entered into their respective fields and the enter command may be automatically executed.

DTMF information may be utilized for telephonic applications as opposed to pure computing applications. More specifically, the DTMF information may be used to convert the user name and password into DTMF tones that can be registered by a PBX or similar type of call processing equipment. For example, the DTMF information may be included in application data 504 for a conference bridge that the user will be connecting to at a later time. Thus, the user does not need to remember the conference number and bridge access code when the user goes to join the conference call. Rather, the security module 204 can provide the sensitive data 412 to the phone, which, in turn, can provide the DTMF converted version of the conference number and bridge access code to the conference bridge.

Other examples of additional data will become apparent to those skilled in the art after reviewing contents of the present invention. More specifically, a configuration may be utilized where the security module 204 is incorporated into part of a cell phone, relating to the cell phone keypad in a similar way that other configurations of the present invention have already been described with respect to a keyboard and PC. A phone may be provided to store a password (e.g., a 15-digit string) in an encrypted form and transmit that string if the user enters an appropriate global password that was used to encrypt the string. Once the user enters the appropriate password, the decrypted string can be transmitted by the cell phone to an identified recipient.

In accordance with at least some embodiments of the present invention, the sensitive data 412 may be stored in the format in which it would have been input by the user device 116 (e.g., as character data without any type of encoding). The input device 116 may then encode the sensitive data 412 according to its normal encoding procedures (e.g., using ASCII, DTMF, or the like) prior to transmitting the sensitive data 412 to the computing platform 108, 112. Alternatively, the sensitive data 412 may be stored according to the encoding format that it will ultimately be transmitted in. This may allow the input device 116 to simply forward the sensitive data 412 to the computing platform 108, 112 rather than requiring it to encode the data appropriately.

Additional fields that may be incorporated in the sensitive data structure 412 include a type field that can be used to identify the type of information that is being stored. Examples of entries that may be in the type field include, but are not limited to, business, personal, school, etc. Sensitive data 412 may be secured according to its corresponding type by having a password apply to all entries for a particular type. Other fields that may be provided in the sensitive data structure are counter fields for storing the number of times application data 504 has been accessed, time stamps for identifying when the last time application data 504 was accessed, and time stamps for identifying when the last time application data 504 was edited/added.

Figure 6:
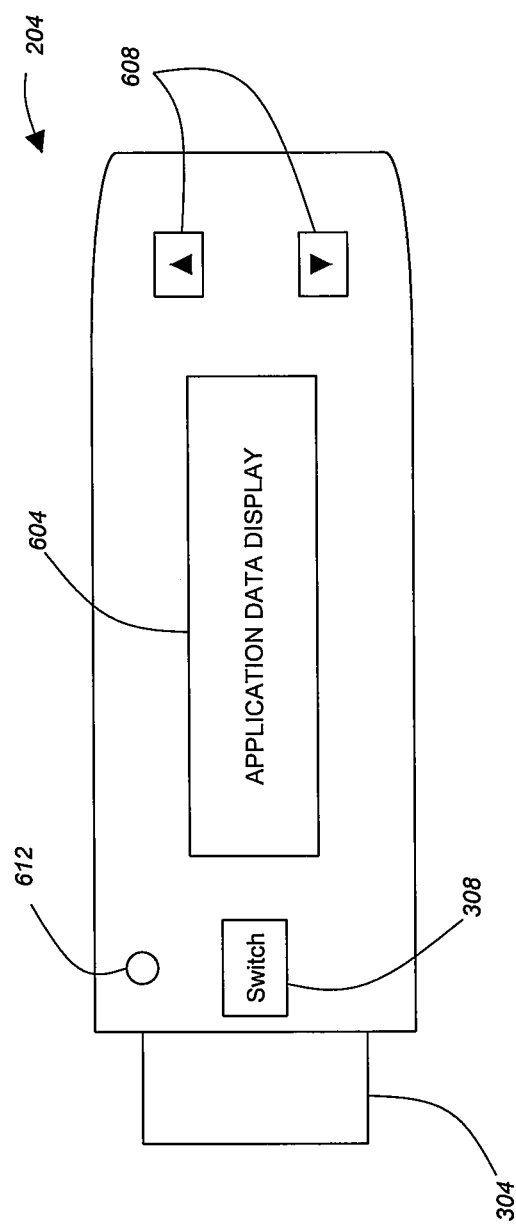
FIG. 6 is a top view of a sensitive data management device in accordance with embodiments of the present invention.

Referring now to FIG. 6, an exemplary security module 204 is depicted in accordance with at least some embodiments of the present invention. The security module 204 may be similar to a portable flash memory device that also include a user engageable switch 308 that controls the operation of the first switched interface 304. The security module 204 may also include an application data display screen 604, which may generally correspond to a user output 428. The user may be able to navigates through the different application data 504 within the sensitive data 412 using the selection keys 608. As the user navigates through the various application data 504, the data in the application identifier field 508 may be displayed via the display screen 604. This represents the data that will be transmitted upon actuation of the switch 308.

The security module 204 may further include another user output 428 in the form of an indicator 612. The indicator 612 may provide the user with an audible and/or visual indication when all of the selected application data 504 has been transmitted from the security module 204 to the input device 116 (e.g., when the output buffer 420 has been cleared). This will allow the user to know when to release the switch 308. Without the indicator 612 a user may accidentally release the switch 308 before all of the application data 504 has been transmitted, which may negatively impact the ability to access the desired application, for example, because not all of the necessary password or user name data has been transmitted. After the indicator 612 confirms that the data has been transmitted, the user may then release the switch 308 and be assured that all of the necessary application data 504 was transmitted. The indicator 612 also helps the user not hold the switch 308 open for too long thereby resulting in a duplicated transmission of application data 504 (which may or may not negatively impact the user's ability to access the associated application, depending upon the configuration of the application). In other configurations where one push of the button (e.g., a movement of the button down and up) transmits the selected data item once may be easier to use, the indicator could be used to indicate that all of the data has been transmitted and the security module 204 can be disconnected from the input device 116.

Figure 7:
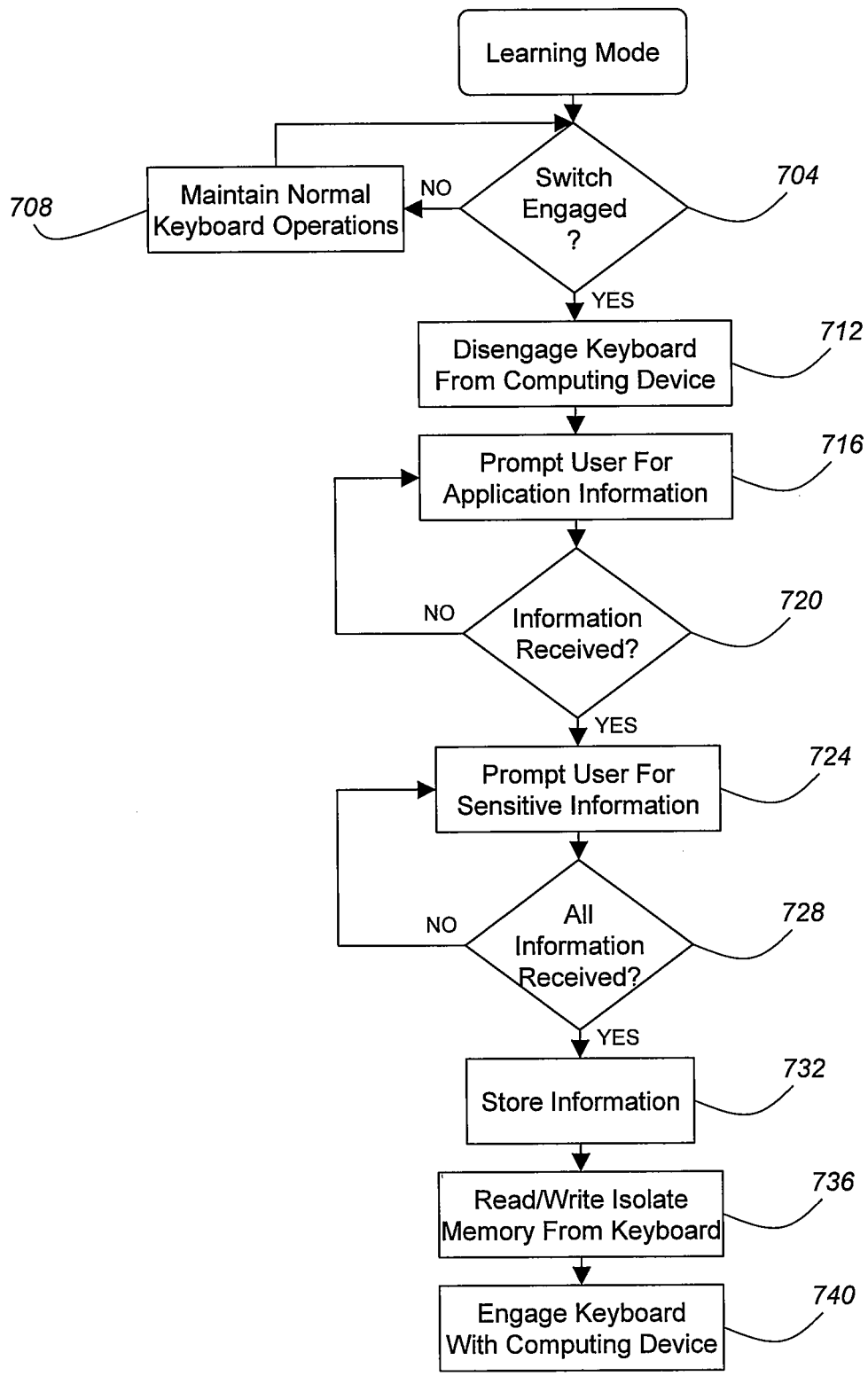
FIG. 7 is a flow diagram depicting a leaning method in accordance with embodiments of the present invention.

FIG. 7 depicts an exemplary leaning mode method in accordance with at least some embodiments of the present invention. The security module 204 may operate in this learning mode to have sensitive data 412 added to memory as well as to amend or delete existing sensitive data 412. The method is initiated when the user engages the switch 308 (step 704). This is, of course, provided that the security module 204 is physically connected to the input device 116. This may not necessarily be a concern in embodiment where the security module 204 is integral to the input device 116, but does apply to situations where a portable security module 204 is employed. If the security module 204 is not correctly physically connected to the input device 116 (e.g., because it is not inserted into the appropriate port) or the switch 308 is not engaged, then the security module 204 will continue to operate in its normal operational mode (step 708). During this step, the input device 116 will also continue to operate in its normal mode where it is capable of providing data to the computing platform 108, 112.

When the switch 308 is eventually engaged, the method continues with the input device 116 disengaging from the computing platform 108, 112 (step 712). This step may include deactivating the second switched interface 312 to preclude electrical communications between the input device 116 and computing platform 108, 112. It should be noted that in a preferred configuration, the second interface 312 is "hot swappable" meaning that it can be switched between an active mode and inactive mode while the computing platform 108, 112 is on.

Once the input device 116 has been disengaged from the computing platform 108, 112, the method continues with the security module 204 prompting the user for application information (step 716). This prompt may be displayed on the user output 428. The types of information that may be requested include the actual application identification data as well as any other data that may be used to differentiate the application data from other application data 504 in the sensitive data 412 structure. This step may also include a search capability that allows a user to find a particular record (e.g., by keyword search and/or identifying certain values for particular fields) and edit fields associated with that record and/or delete the entire record. By providing the user with a search capability, the user can quickly access a record of interest and edit that record without scrolling through all the application data 504 in the sensitive data 412 structure. Thus, a user may be allowed to edit a number of different application data 504 records quickly.

In step 720, it is determined if all of the necessary application information is received. This determination may be made by the user selecting a menu option saying that all application information has been entered. Alternatively, if there are only a fixed number of data fields for containing application identification information, then once each of the data fields have been populated, the processor 404 may automatically determine that all necessary application information has been entered. If there is additional application information to be entered, then the method returns to step 716. After this determination has been affirmatively made, the method continues with the security module 204 prompting the user for sensitive data 412 (step 724). The types of sensitive data 412 that may be entered by a user in this step includes a password (e.g., a master password) that will be used to protect access to the application data 504. For example, if the user enters a master password to protect access to all of the sensitive data 412, then any subsequent access to that sensitive data 412 will require the user to enter the master password before the security device 412 transmits any application data 504. Of course, more than one security password may be used, but it is preferable to keep the number of passwords that the user has to remember to a minimum. The user may further enter the actual sensitive data 412 that will be used in connection with the associated application (e.g., user name, application password(s), encryption keys (assuming one isn't automatically assigned by the processor 404 and assuming the encryption key differs from the access authorization password), and any additional data). The user may enter each type of data and indicate that a new type of data is being entered by actuating the user input 432. This will allow the processor 404 to know that the next data being entered should be placed in a different field of the sensitive data 412. In step 728 it is determined whether all of the sensitive data 412 has been entered for particular application. If not, then the method returns to step 724. If all of the data has been entered, then the method continues with the processor 404 causing the sensitive data 412 to be stored in memory (step 732). The processor 404 may cause the sensitive data 412 to be stored either in local memory 408 or in memory of a portable credential 440.

After the sensitive data 412 has been appropriately stored, the method continues with the security module 204 read/write isolating itself from the input device 116 (step 736). This step may be effectuated by the user disengaging the switch 308, which causes the first switched interface 308 to deactivate. Once the security module 204 has been appropriately isolated from the input device 116, and there is no way for malware operating through the input device 116 to retrieve the sensitive data 412, then the method continues with the second switched interface 312 re-activating to thereby engage the input device 116 with the computing platform 108, 112 (step 740). At this point, the input device 116 and computing platform 108, 112 can operate in a normal fashion and the security module 204 can be removed from the input device 116 if the security module 204 is portable in nature.

Figure 8:
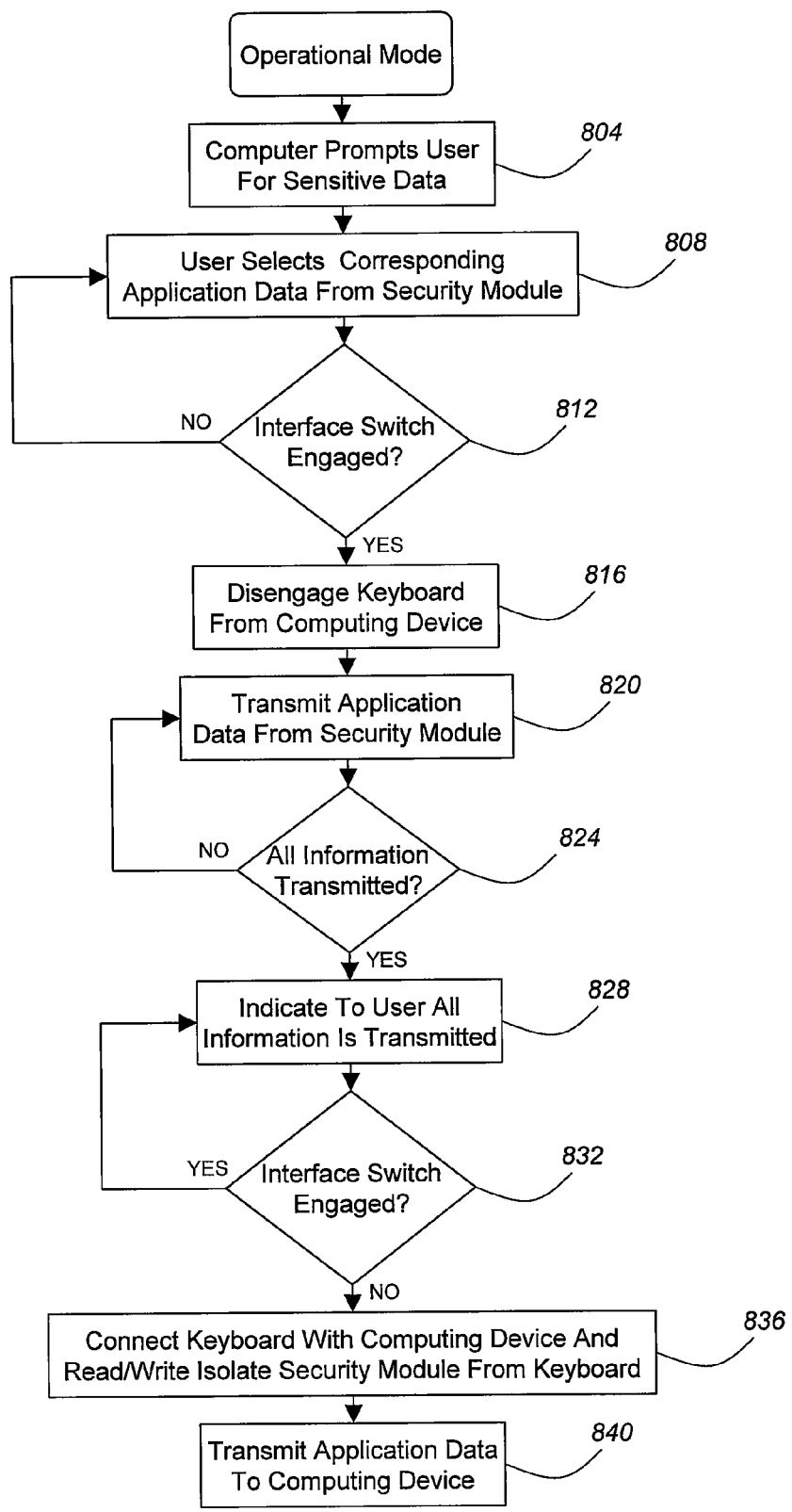
FIG. 8 is a flow diagram depicting an operational method in accordance with embodiments of the present invention.

With reference now to FIG. 8, a flow chart depicting an operational mode of a security module 204 will be described in accordance with at least some embodiments of the present invention. The method begins when the user tries to access a particular secured application such as the user's personal desktop, a web-based application, a conference call, a password protected file, a personal account (e.g., a bank account or on-line shopping account) or the like. When the user attempts to access such a secured application the computing platform 108, 112 will likely display the fields that need to be entered by the user to access the application via the user display 104, essentially prompting the user for sensitive data 412 (step 804). In response to receiving this prompt for sensitive data 412, the user may attempt to enter the sensitive data 412 via the input device 116, if the user remembers the particular sensitive data 412 that can be used to access the application. Alternatively, the user may elect to utilize their security module 204 to supply the appropriate sensitive data 412 to the computing platform 108, 112 for entry into the appropriate field. If this is the case, then the method continues with the user selecting the corresponding application data 504 from the security module 204 (step 808). The user may navigate through the various application data sets 504 stored in the sensitive data 412, using the user input 432, until the desired application identifier is displayed via the user output 428. Once the user has selected the appropriate application data 504, the data in the corresponding data fields is retrieved by the processor 404 and input into the output buffer 420 where it stays until the switch 308 is engaged (step 812). If the user does not engage the switch 308, then the switched interface 304 will continue to block the transfer of data to/from the security module 204 thereby causing the application data 504 to remain in the output buffer 420. Engagement of the switch 308 may actually correspond to a two-step process wherein a user is first required to enter an access authorization password associated with the selected application data 504 and after the password has been received, the user is then required to physically engage the switch 308 to allow transmission of the selected application data 504.

Once the user engaged the switch 308 (and provided the appropriate access authorization password), the method continues with the input device 116 disengaging from the computing platform 108, 112 (step 816). This may be either a logical disengagement (e.g., restrict execution of read/write commands to/from the input device 116) or a physical disengagement (e.g., by removing the electrical connectivity between the input device 116 and computing platform 108, 112.

After the input device 116 has been disengaged from the computing platform 108, 112, the method continues with the first switched interface 304 becoming activated, thereby enabling data communications between the input device 116 and the security module 204. At this point the security module 204 is free to transmit the selected application data 504 to the input device 116 (step 820). The selected application data 504 may be transmitted via the output channel 416 and may correspond to the application data 504 that was residing in the output buffer 420. In accordance with at least some embodiments of the present invention, the application data 504 may be pushed from the security module 204 (e.g., since it is being transferred without receiving a formal read command) to the input device 116. This is similar to an actual user typing in the sensitive data 412 from the input device 116, except the user does not need to remember the sensitive data 412.

In step 824, it is determined if all of the necessary application data 504 has been transmitted. In accordance with at least one embodiment of the present invention, the selected application data 504 may only be transmitted once. Alternatively, there may be multiple transmissions of the selected application data 504 to a buffer in the input device 116. The input device 116 or the processor 108 may then parse (e.g., perform a block-by-block data comparison) through all of the received data and remove any duplicate data chunks, thereby leaving only one copy of the application data 504 for eventual transmission to the associated application. If all of the information has not yet been transmitted, then the method returns to step 820.

If, on the other hand, all of the application data 504 has been transmitted (e.g., the output buffer 420 has transmitted all of the necessary fields of application data 504), then the method continues with the security module 204 indicating to the user that all of the information has been transmitted (step 828). This may be accomplished by activating (e.g., illuminating or sounding) the indicator 612 or by presenting some other indication to the user via the user output 428.

When the indication has been provided to the user, the security module 204 then determines whether the switch 308 has been engaged (step 832). If the switch 308 has not yet been engaged, the method returns to step 828. When the switch 308 is engaged for a second time (i.e., either pressed a second time or released after the initial engagement), then the switched interfaces 308, 312 may toggle between their active and inactive states respectively (step 836). This may cause the security module 204 to be read/write isolated from the input device 116 and then cause the input device 116 to reestablish communications with the computing platform 108, 112. With the input device 116 now connected with the computing platform 108, 112, the application data 504 is forwarded (e.g., pushed) from the input device 116 to the computing platform 108, 112 as if it were actually entered by a user at the input device 116 (step 840). At this point the application data 504 can be automatically input by the processor 108 into the appropriate fields in the application.

Although embodiments of the present invention have been primarily described as working in connection with standard computing platforms, those skilled in the art will appreciate that the security module 204 of the present invention may be used for various other applications such as telecommunication applications (e.g., with gaining access to secure conference bridges), credit approval applications (e.g., with qualifying for certain lines of credit), payment approval applications (e.g., with accessing certain personal financial accounts from a Point of Service (POS) machines and authorizing payment therefrom), and other known applications requiring the use of sensitive data 412.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for maintaining data in a secure format until it is desirable to transmit such data to a computing platform. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
   maintaining user input data on a security module;
   restricting read/write access to the security module until a physical user action has been taken at the security module, wherein the security module is in communication with a user input device when the read/write access to the security is restricted;
   detecting a first user input at the security module, wherein the first user input comprises (i) receiving an access authorization password associated with a user-selected amount of user input data and (ii) receiving an indication that a physical switch has been engaged that indicates transmission of the user-selected amount of user input data is allowable;
   in response to detecting the first user input, transmitting the user-selected amount of the user input data from the security module to a computing platform, the method further comprising:
   in response to detecting the first user input, deactivating a switched interface between the input device and the computing platform and then activating a switched interface between the security module and the input device;
   transmitting the user-selected amount of the user input data from the security module to the input device;
   detecting a second input at the security module; and
   in response to detecting the second user input, deactivating the switched interface between the security module and the input device and then activating the switched interface between the input device and the computing platform thereby allowing the user-selected amount of user input data to be transmitted to the computing platform.

2. The method of claim 1, further comprising: the input device encoding the user-selected amount of user input data according to a protocol used by the input device to communicate with the computing platform; and the input device transmitting the encoded user-selected amount of user input data.

3. The method of claim 1, wherein the input device comprises at least one of a keyboard, mouse, phone, and Point of Service (POS) device.

4. The method of claim 1, further comprising:
   detecting that all of the user-selected amount of user input data has been transmitted from the security module, wherein detecting that all of the user-selected amount of user input
   providing an indication to a user of the security module that the user-selected amount of user input data has been transmitted from the security module.

5. The method of claim 1, wherein the user-selected amount of user input data comprises at least one of a user name, a password, encryption data, identification information, user preferences, account information, field entry instructions, and signal conversion information associated with an application that is accessible via the computing platform, and wherein the physical switch is a device configured to make or break a connection between terminals of an electrical circuit.

6. The method of claim 1, further comprising:
connecting the security module to a user input device that is in communication with the computing platform; disengaging the user input device from the computing platform;
allowing read/write access to the security module while the user input device is disengaged from the computing platform;
receiving user input at the user input device; and
updating the data on the security module with the input received at the user input device.

7. A non-transitory computer readable medium comprising processor executable instructions operable to perform the method of claim 1.

8. A user input device comprising a security module, comprising:
memory operable to store user input data;
a processor operable to retrieve user-selected application data from the user input data;
a first switched interface operable to restrict read/write access to the user input data until (i) an access authorization password associated with the user input data has been received and (ii) engagement of a physical switch has been detected; and
a second switched interface that facilitates selective communication between the user input device and a computing platform, wherein while the first switched interface of the security module is in an active state the second switched interface of the user input device is in an inactive state and wherein while the first switched interface of the security module is in an inactive state the second switched interface of the user input device is in an active state.

9. The security module of claim 8, further comprising:
an output buffer for storing the user-selected application data until the physical switch is engaged, wherein contents of the output buffer comprise a single instance of the user-selected application data.

10. The security module of claim 9, further comprising:
a user output operable to indicate to a user of the security module when transfer of the user-selected application data from the security module has completed.

11. The security module of claim 8, wherein the user input device further comprises the switch.

12. The security module of claim 8, wherein the switched interfaces are adapted to allow user input data transmissions there through while in an active state and wherein the switched interfaces are adapted to restrict data transmission there through while in an inactive state.

13. A computing system, comprising:
a user input device operable to provide user inputs to a computing platform;
a security module operable to maintain user input data in a secure state, restrict the user input device from accessing the user input data until a physical user action has been taken at the security module, detect a first user input, and in response to detecting the first user input, transmit a user-selected amount of user input data to the user input device;
a first switched interface between the security module and the user input device;
a second switched interface between the user input device and the computing platform; and
wherein, in response to detecting the first user input, the second switched interface is deactivated and then the first switched interface is activated such that the user-selected amount of the user input data is transmitted from the security module to the user input device and wherein in response to detecting a second user input, the first switched interface is deactivated and then the second switched interface is activated such that the user-selected amount of user input data is transmitted to the computing platform.

14. The system of claim 13, wherein the first user input comprises (i) receiving an access authorization password associated with the user-selected amount of user input data and (ii) receiving an indication that a physical switch has been engaged that indicates transmission of the user-selected amount of user input data is allowable, and wherein the user input device is further operable to forward the user-selected amount of user input data received from the security module to a computing platform.

15. The system of claim 14, wherein the user-selected amount of user input data comprises at least one of a user name, a password, encryption data, identification information, user preferences, account information, field entry instructions, and signal conversion information associated with an application that is accessible via the computing platform.

16. The system of claim 13, further comprising:
a switch provided on at least one of the security module and user input device, wherein the switch is operable to receive the first user input; and
a user output device operable to indicate to a user that all of the user-selected amount of user input data has been transmitted to the user input device.

* * * * *

UNITED STATES PATENT AND TRADEMARK OFFICE
CERTIFICATE OF CORRECTION

PATENT NO. : 8,707,452 B1  Page 1 of 1
APPLICATION NO. : 12/102655
DATED : April 22, 2014
INVENTOR(S) : Frederick P. Block et al.

It is certified that error appears in the above-identified patent and that said Letters Patent is hereby corrected as shown below:

In the Claims:

Column 16, please replace line 17 with:
--the security module is restricted;--

Column 16, please replace line 35 with:
--detecting a second user input at the security module; and--

Column 16, please replace line 55 with:
--user input data comprises determining that contents of an output buffer have been emptied; and--

Signed and Sealed this
First Day of July, 2014

Michelle K. Lee
*Deputy Director of the United States Patent and Trademark Office*